(12) United States Patent
Howard, Jr.

(10) Patent No.: US 7,059,813 B1
(45) Date of Patent: Jun. 13, 2006

(54) GUIDE SYSTEM FOR A GLASS RACK STAKE

(76) Inventor: Richard A. Howard, Jr., 32201 S. 620 Rd., Grove, OK (US) 74344

( * ) Notice: Subject to any disclaimer, the term of this patent is extended or adjusted under 35 U.S.C. 154(b) by 0 days.

(21) Appl. No.: 10/919,057

(22) Filed: Aug. 16, 2004

(51) Int. Cl.
*B60P 7/06* (2006.01)
*B61D 3/16* (2006.01)

(52) U.S. Cl. ............................. 410/32; 296/43
(58) Field of Classification Search ............ 410/32, 410/44, 106, 110, 112, 116, 101; 296/43; 24/265 CD, 115 K; 248/499
See application file for complete search history.

(56) References Cited

U.S. PATENT DOCUMENTS

| | | | | |
|---|---|---|---|---|
| 351,246 A * | 10/1886 | Bothe | ..................... | 296/43 |
| 1,166,490 A * | 1/1916 | Swayze | ..................... | 296/43 |
| 1,548,518 A * | 8/1925 | Edlich | ..................... | 296/43 |
| 1,625,745 A | 4/1927 | Rhodes | | |
| D144,900 S * | 6/1946 | Boepple | ..................... | D12/414 |
| 2,481,598 A * | 9/1949 | Jones | ..................... | 410/102 |
| 2,518,624 A | 8/1950 | Kraft | ..................... | 211/13 |
| 2,569,118 A * | 9/1951 | Sherman | ..................... | 280/47.18 |
| 2,644,715 A * | 7/1953 | Sammis | ..................... | 296/43 |
| 2,700,520 A * | 1/1955 | Skubic | ..................... | 108/53.5 |
| 2,808,788 A * | 10/1957 | Stough | ..................... | 410/89 |
| 2,919,811 A | 1/1960 | Schodorf, Sr. | ..................... | 211/41 |
| 3,512,608 A | 5/1970 | Huntley | ..................... | 182/93 |
| 3,661,420 A * | 5/1972 | Swanson et al. | ..................... | 296/43 |
| 3,809,234 A | 5/1974 | Kurick | ..................... | 206/448 |
| 3,815,755 A | 6/1974 | Lyszczek | ..................... | 211/41 |
| 3,858,905 A | 1/1975 | Peebles | ..................... | 280/163 |
| 3,937,329 A | 2/1976 | Hammerel | ..................... | 211/41 |
| 4,719,872 A | 1/1988 | Ritten | ..................... | 114/362 |
| 4,724,925 A | 2/1988 | Ritten | ..................... | 182/97 |
| 5,113,782 A | 5/1992 | McCarty | ..................... | 114/362 |
| 5,803,645 A | 9/1998 | Moser et al. | ..................... | 403/243 |
| 6,082,687 A | 7/2000 | Kump et al. | ..................... | 248/220 |

\* cited by examiner

*Primary Examiner*—H Gutman
(74) *Attorney, Agent, or Firm*—Head, Johnson & Kachigian

(57) ABSTRACT

A guide is attached to the top of a glass rack on a glass transporting vehicle. When attaching a brace to the rack, the top stake is engaged to the guide. The guide automatically directs the top stake into its corresponding spot.

9 Claims, 3 Drawing Sheets

GUIDE SYSTEM FOR A GLASS RACK STAKE

BACKGROUND OF THE INVENTION

1. Field of the Invention

The present invention relates to a guide system designed to assist in inserting a stake on a glass rack into a slot. Specifically, the present invention relates to a guide system consisting of a device protruding outward from the edges of a slot having slanted walls that automatically align the stake with the slot into which it is to be fitted.

2. Prior Art

Because plate glass shatters easily, care must be taken in transporting it. Typically, large glass plates are stacked next to one another and slightly slanted against a series of supports on one or both sides of a pickup or other truck. Braces are then placed on the outside of the glass plates to hold them firmly in place between the supports and the stakes. In order to attach the braces to the frames, the braces are fitted with stakes that fit securely into slots on a frame. These frames are typically several feet tall. Because of this, the slots on the top of the frame into which the top stakes are to be inserted may not be seen by an operator at ground level. Accordingly, a trial and error approach is used. The stake must simply be slid around on top of the rack until it falls into a slot. It may take a substantial amount of time to find the proper slot for the stake.

There have been several designs developed for improving glass racks mounted on vehicles. There have also been numerous designs for a tongue and groove and similar engagement structures to facilitate insertion of the tongue portion with the groove portion. Those skilled in the art will appreciate that the stake and slot engagement system utilized by braces on glass racks is essentially a tongue and groove design. The following patents illustrate inventions relating to improvements on glass racks and tongue and groove designs.

Rhodes (U.S. Pat. No. 1,625,745) discloses a bracket for a building roof having a semi-cup shaped member to receive a head of a hook.

Kraft (U.S. Pat. No. 2,518,624) discloses an example of a rack structure for a glass truck. Removable inner and outer stakes carry adjustable clamps in order to engage the glass panels. Each stake has a lateral arm having a down turned hook that carries a stud to be received in a slot in a frame.

Schodorf, Sr. (U.S. Pat. No. 2,919,811) discloses a plate glass rack having spaced, removable stakes or standards. Upper section of the standard is provided with a hook which fits around the top board of the rack.

Huntley (U.S. Pat. No. 3,512,608) discloses a bracket to receive an inverted U-shaped ladder. An upper part of the bracket is cut away to provide a throat or guide into which a ladder flange is slidable.

Lyszczek (U.S. Pat. No. 3,815,755) discloses an adjustable stake for a glass rack having an upper end with an L-shaped support member received in the glass rack.

Peebles (U.S. Pat. No. 3,858,905) discloses a demountable ladder having lugs receivable in sockets.

Ritten (U.S. Pat. No. 4,719,872) discloses a boat ladder with a bracket having a U-shaped slot to receive a ladder latch plate.

McCarty (U.S. Pat. No. 5,113,782) discloses a boat ladder having a connector portion received in a tubular rod holder on a boat.

Moser et al. (U.S. Pat. No. 5,803,645) discloses a spindle guide to receive and hold a tube.

The prior art does not disclose a method or apparatus for rapidly inserting a tongue or stake into a groove or slot that is not within the line of sight of the operator.

The prior art does not disclose a method or apparatus for guiding a stake in both side to side orientation and front to back orientation into a slot.

It is therefore desirable to provide a means for guiding a tongue or stake into a groove or slot.

It is also desirable to provide a method for guiding a stake into a slot on the top of a glass rack such that the stake is rapidly and efficiently placed within the desired slots.

SUMMARY OF THE INVENTION

The present invention provides a mechanism for rapidly and accurately inserting the top stake of a brace for a glass rack into the proper slot on the top of the rack. It includes a guide that rests directly on the top of the glass rack and has outwardly slanting walls surrounding three of the four sides to the slots on the top of the glass rack. Once a stake makes contact with one or more of the slanted walls, it will automatically fall directly into the desired slot merely by moving the brace downward. Because the guide protrudes upward, it is in view of the operator. The operator merely makes contact between the top stake of the brace and the guide and then lets the brace drop. The guide ensures that it falls into the appropriate slot. Those skilled in the art will appreciate that this greatly increases the speed with which a brace may be attached to a glass rack.

A variety of different designs may be used to make an appropriate guide. It may be desirable to connect a series of guides on a single piece of material. This may ease manufacturing and attachment of the guides. So long as the guides provide three slanted walls that align with three of the four sides of the slot on top of the rack, the guide will perform well. The walls may even be curved. It will also be appreciated that the guides do not need to be substantially visible, because the guide creates a much larger target area for which the operator can aim for a particular slot. Without the guide, an operator must place the stake in the exact spot where the slot is. Using a guide, the operator needs only to place the stake relatively close to the location of the slot and the guide will move the stake to the exact location.

DETAILED DESCRIPTION OF THE PREFERRED EMBODIMENTS

The embodiments discussed herein are merely illustrative of specific manners in which to make and use the invention and are not to be interpreted as limiting the scope of the instant invention.

While the invention has been described with a certain degree of particularity, it is to be noted that many modifications may be made in the details of the invention's construction and the arrangement of its components without departing from the spirit and scope of this disclosure. It is understood that the invention is not limited to the embodiments set forth herein for purposes of exemplification.

The present invention is a guide means that assists in the insertion of a tongue or stake into a slot or groove that is not visible to the operator. The invention is particularly useful when used in conjunction with a rack mounted on a vehicle for transporting glass. The device readily guides the top stake of a brace used on a glass holding rack into the desired slot in a time efficient and reliable manner.

Figure 1:
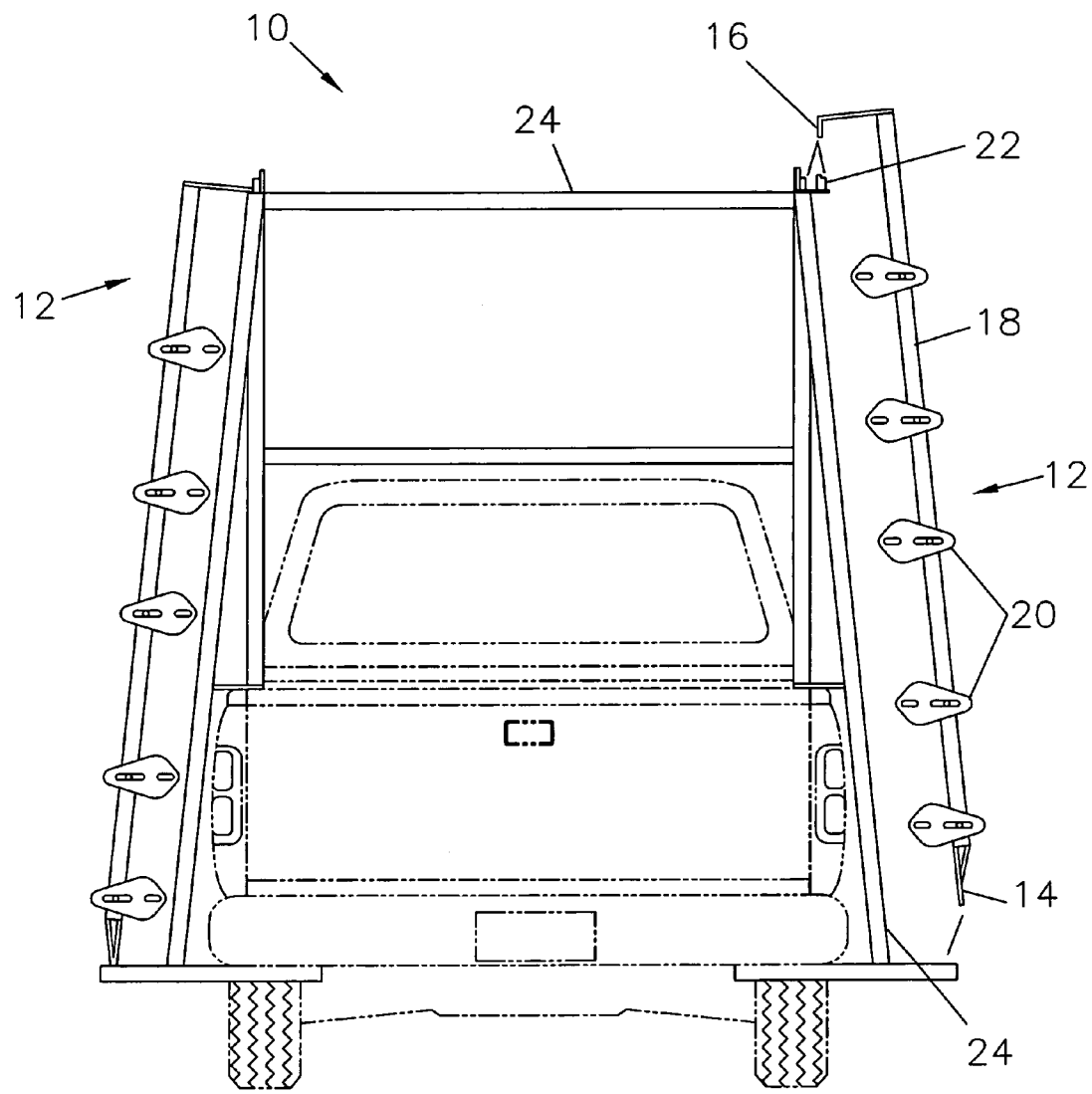
FIG. 1 shows an environmental view of the invention.

FIG. 1 shows an environmental view of the invention. Glass transporting vehicle 10 has a glass rack 24 into braces 12. Braces 12 hold glass panes against racks 24 securely. Brace 12 consists of rod 18 having multiple adjustable pins 20 and a bottom stake 14 and a top stake 16. Guide 22 located on the top of frame 24 guides top stakes 16 into the appropriate slot.

Figure 2:
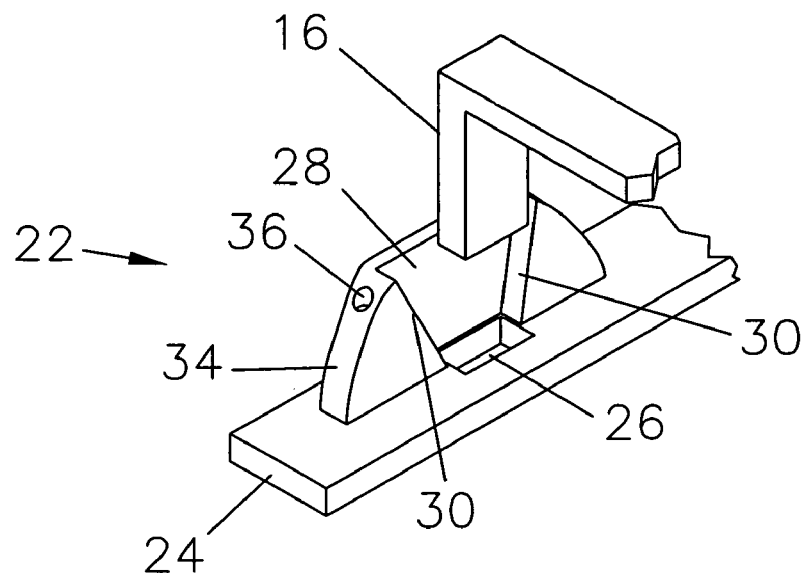
FIG. 2 shows a perspective view of a preferred embodiment of the present invention.

Guide 22 can be seen more clearly in FIG. 2. Top stake 16 fits into slot 26. Guide 22 is comprised of a body 34. Body 34 may be comprised of metal, plastic or other suitable material. Guide 22 is bolted to frame 24 by means of bore 36 drilled through body 34. Guide 22 has slanted guide walls 30 on either side of slot 26 and rear guide wall 28 that lines up flush with the back side of slot 26. Those skilled in the art will appreciate that when stake 16 makes contact with back guide wall 28 and/or side guide walls 30, stake 16 will slide directly into slot 26.

Figure 3:
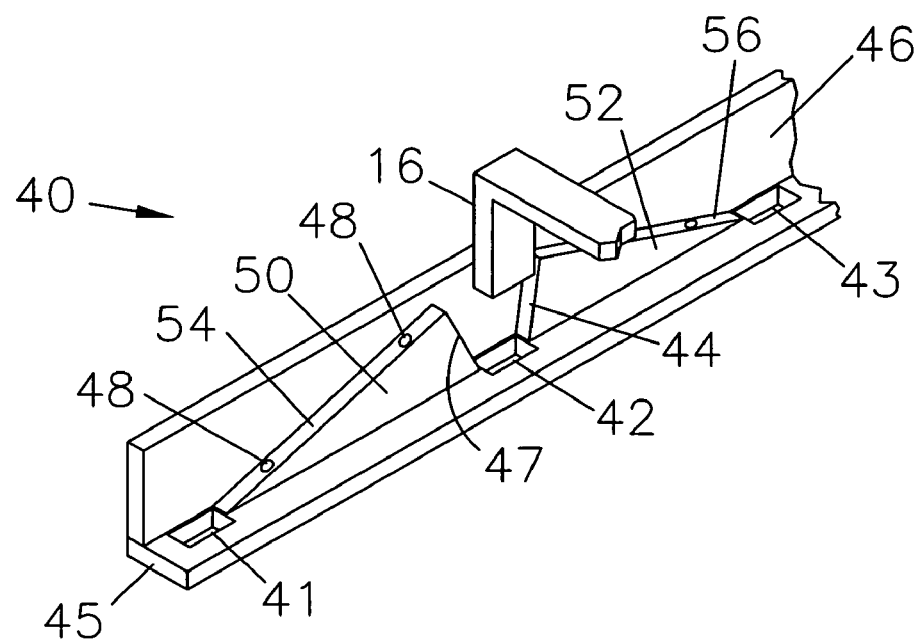
FIG. 3 shows an alternative embodiment of the invention.

FIG. 3 shows an alternative embodiment of the invention. The embodiment in FIG. 2 is designed as a guide for a single slot. The design shown in FIG. 3 may be used along the entire length of the top of the frame and serve as a guide for multiple slots. Guide 40 includes a back plate 46 and guide panels 50 and 52 that are attached to back plate 46. Guide panels 50 and 52 have bores 48 through which they may be bolted, screwed, nailed or otherwise attached to frame 45. Guide panels 50 and 52 have slanted sides 44, 54, 56 and 47. Those skilled in the art will appreciate that when stake 16 comes into contact with back panel 46 and/or one of the slanted sides of panels 50 and 52, it will be guided directly into slot 42 or, alternatively, slots 41 or 43. In this embodiment and that shown in FIG. 2, the guiding walls or edges are straight. Those skilled in the art will appreciate that these may be curved also. It will also be appreciated that the angles at which the guide plates and guide walls are at may vary widely, so long as they effectively move the stake toward the slot.

Figure 4:
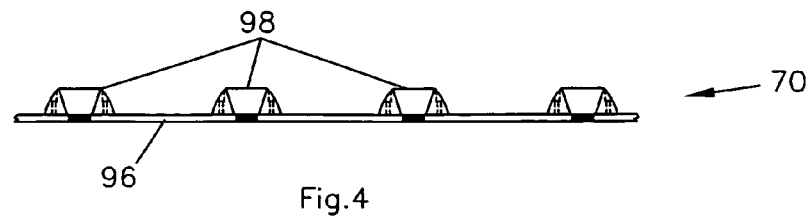
FIG. 4 shows a front view of an alternative embodiment of the present invention.
Figure 5:
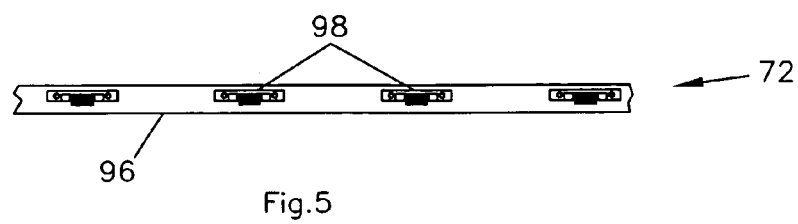
FIG. 5 shows a top plan view of the embodiment shown in FIG. 4.
Figure 6:
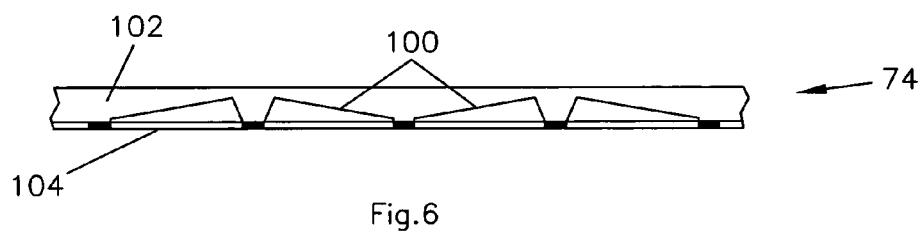
FIG. 6 shows a front view of an alternative embodiment of the invention.
Figure 7:
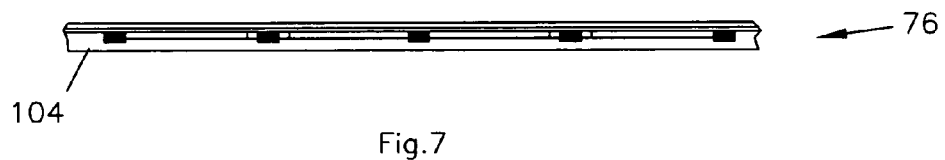
FIG. 7 shows a top plan view of the embodiment shown in FIG. 6.
Figure 8:
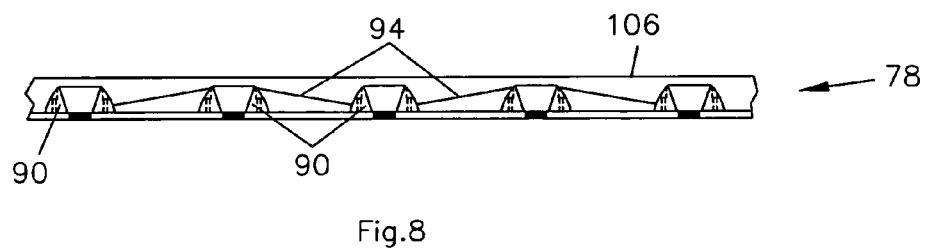
FIG. 8 shows a front view of an alternative embodiment of the present invention.
Figure 9:
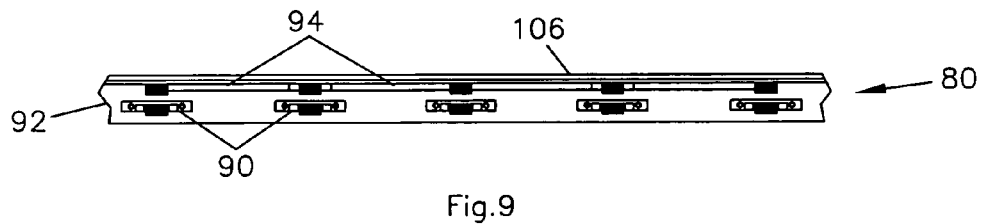
FIG. 9 shows a top plan view of the embodiment shown in FIG. 8.

FIG. 4 shows alternative use of the design shown in FIGS. 2 and 3, as well as a combination of the two. 70 is a front planned view of a series of guides having the same design as that shown in FIG. 2. Here, guides 98 are all attached to beam 96 which may then be attached to the top of the frame of a glass plane rack. This simplifies the installation of the guide. 72 is a top plan view of the same series of guides 70. 74 and 76 show a front and top view, respectively, side panels 100 are flush with and attached to back panel 102 and both are attached to beam 104. As with beam 96, beam 104 simplifies installation of the series of guides. 78 and 80 respectively show a front and top plan view of a series of stake guides that are a combination of the designs shown in FIGS. 2 and 3. Guides 90 are essentially the same design as guides 22 of FIG. 2 and guide panels 94 and back panel 106 are similar to the design shown in FIG. 3. This combination may be used when there are two rows of slots on the top of the glass racks frame. This allows the operator to adjust the distance between the brace and the frame.

As can be seen in the drawings, the guiding sides of the guides form approximately a 70° angle with the plane of the top of the glass rack frame. The embodiment shown in FIG. 3 also includes side guides 54 and 56 that are at an approximately 30° angle to the top of the glass rack frame. Those skilled in the art will appreciate that the preferred angle will be between 20° and 80°, preferably 70° to 30°. The back panels in the embodiments shown are at a 90° angle to the top of the rack. It is generally preferred to have the back panel at a greater angle, preferably between 90° and 50°. This increases the ease with which the guide may direct the stake into a slot.

It may also be desirable to cast or mold the guide from one material and coat it with another. Coating may make the body erosion resistance or it may decrease the friction between the guide and the stake as it moves into a slot.

Whereas, the present invention has been described in relation to the drawings attached hereto, it should be understood that other and further modifications, apart from those shown or suggested herein, may be made within the spirit and scope of this invention.

What is claimed is:

1. A device for guiding a stake into a slot into a substantially planar top of a frame of a glass rack wherein said slot has a plurality of sides, said device comprises:

a back panel having a bottom and that forms an angle with the top of the frame of the glass rack that is between 90° and 50°;

at least one side guide panel having a bottom and that forms an angle with the frame of the glass rack that is between 20° and 80°;

wherein the bottoms of the back panel and the at least one side guide panel are flush with the sides of the slot and wherein said stake is received in said slot.

2. The device of claim 1 wherein said back panel and said at least one side guide panel are comprised of a material selected from the group consisting of metal, plastic, rubber, ceramic, stone and wood.

3. The device of claim 1 wherein the at least one side guide panel comprises two side guide panels.

4. The device of claim 3 wherein said slot has four said sides, and wherein said bottom of said back panel and said two guide panels are flush with three said sides.

5. The device of claim 1 wherein said back panel and said at least one side guide panel are mounted on top of said frame.

6. A device for guiding a stake into slots in a substantially planar top of a frame of a glass rack wherein said slots have sides wherein each said device comprises:

a back panel having a bottom and that forms an angle with the top of the frame of the glass rack that is between 90° and 50°;

at least one side guide panel having a bottom and that forms an angle with the top of the frame of the glass rack that is between 20° and 80°;

wherein the bottoms of the back panel and the at least one side guide panel are flush with the sides of one said slot and wherein said stake is received in the slot; and,
wherein a plurality of said devices are connected by a horizontal beam.

7. The device of claim 6 wherein said back panel and said at least one side guide panel are comprised of a material selected from the group consisting of metal, plastic, rubber, ceramic, stone and wood.

8. The device of claim 6 wherein the at least one side guide panel comprises two side guide panels.

9. A method for guiding a stake into slots on a substantially planar top of a glass rack frame comprising:
   engaging a stake with a back panel of a guide;
   engaging the stake with at least one side guide panel of the guide;
   lowering the stake such that it engages a slot aligned with said back panel and said at least one side guide panel, wherein said stake is no longer engaged with said back panel or side guide panel once engaged in said slot.

* * * * *